(12) United States Patent
Yoshimoto

(10) Patent No.: US 10,003,705 B2
(45) Date of Patent: Jun. 19, 2018

(54) DISPLAY PROCESSING DEVICE AND IMAGE FORMING APPARATUS

(71) Applicant: KYOCERA Document Solutions Inc., Osaka (JP)

(72) Inventor: Yusuke Yoshimoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days. days.

(21) Appl. No.: 15/392,774

(22) Filed: Dec. 28, 2016

(65) Prior Publication Data
US 2017/0201638 A1 Jul. 13, 2017

(30) Foreign Application Priority Data
Jan. 7, 2016 (JP) .................................. 2016-001725

(51) Int. Cl.
H04N 1/00 (2006.01)
H04N 1/44 (2006.01)

(52) U.S. Cl.
CPC ..... *H04N 1/00506* (2013.01); *H04N 1/00411* (2013.01); *H04N 1/00416* (2013.01); *H04N 1/00424* (2013.01); *H04N 1/00432* (2013.01); *H04N 1/00435* (2013.01); *H04N 1/4406* (2013.01); *H04N 2201/0094* (2013.01)

(58) Field of Classification Search
USPC ....................................................... 358/1.14
See application file for complete search history.

(56) References Cited

U.S. PATENT DOCUMENTS

| | | | |
|---|---|---|---|
| 8,542,385 B2 * | 9/2013 | Akutsu | G06F 15/00 358/1.13 |
| 2011/0096348 A1 * | 4/2011 | Ebi | G03G 15/50 358/1.14 |
| 2012/0019554 A1 * | 1/2012 | Narimatu | G06F 3/0481 345/629 |
| 2016/0006887 A1 * | 1/2016 | Takenaka | H04N 1/4433 358/1.13 |

FOREIGN PATENT DOCUMENTS

JP 2004-289691 A 10/2004

* cited by examiner

*Primary Examiner* — Ngon Nguyen
(74) *Attorney, Agent, or Firm* — Studebaker & Brackett PC (57) ABSTRACT

A display processing device includes a controller and a display section having a display surface. The controller causes one or more first objects to be displayed on the display surface. Upon one of the first objects being selected, the controller creates a first screen including one or more second objects, which are objects located in a level one level lower than that of the selected first object in a hierarchy. The controller acquires a third object, which is an object located in a level lower than that of the selected first object in the hierarchy, by reference to a specific condition. The controller creates a second screen including one or more fourth objects, which are objects located in a level one level lower than that of the third object in the hierarchy. The controller causes the first and second screens to be simultaneously displayed on the display surface.

8 Claims, 11 Drawing Sheets

DISPLAY PROCESSING DEVICE AND IMAGE FORMING APPARATUS

INCORPORATION BY REFERENCE

The present application claims priority under 35 U.S.C. § 119 to Japanese Patent Application No. 2016-001725, filed on Jan. 7, 2016. The contents of this application are incorporated herein by reference in their entirety.

BACKGROUND

The present disclosure relates to a display processing device and an image forming apparatus.

A display processing device such as a touch panel displays objects such as icons, folders, and files in accordance with a hierarchy of the objects. More specifically, upon an object being selected, the display processing device only displays an object located in a level one level lower than that of the selected object.

SUMMARY

A display processing device according to the present disclosure includes a display section, a storage device, and a controller. The display section has a display surface. The storage device stores therein a control program. The controller controls operation of the display section through execution of the control program. The controller causes one or more first objects to be displayed on the display surface. Upon one of the one or more first objects displayed on the display surface being selected, the controller acquires one or more second objects and creates a first screen including the acquired one or more second objects. The one or more second objects are objects located in a level one level lower than that of the selected first object in a hierarchy. The controller acquires a third object by reference to a specific condition. The third object is an object located in a level lower than that of the selected first object in the hierarchy. The controller acquires one or more fourth objects and creates a second screen including the one or more fourth objects. The one or more fourth objects are objects located in a level one level lower than that of the third object in the hierarchy. The controller causes the first screen and the second screen to be simultaneously displayed on the display surface.

An image forming apparatus according to the present disclosure includes the above-described display processing device.

DETAILED DESCRIPTION

The following describes a display processing device and an image forming apparatus according to an embodiment of the present disclosure with reference to the accompanying drawings. Elements that are the same or equivalent are indicated by the same reference signs in the drawings and description thereof is not repeated.

Figure 1:
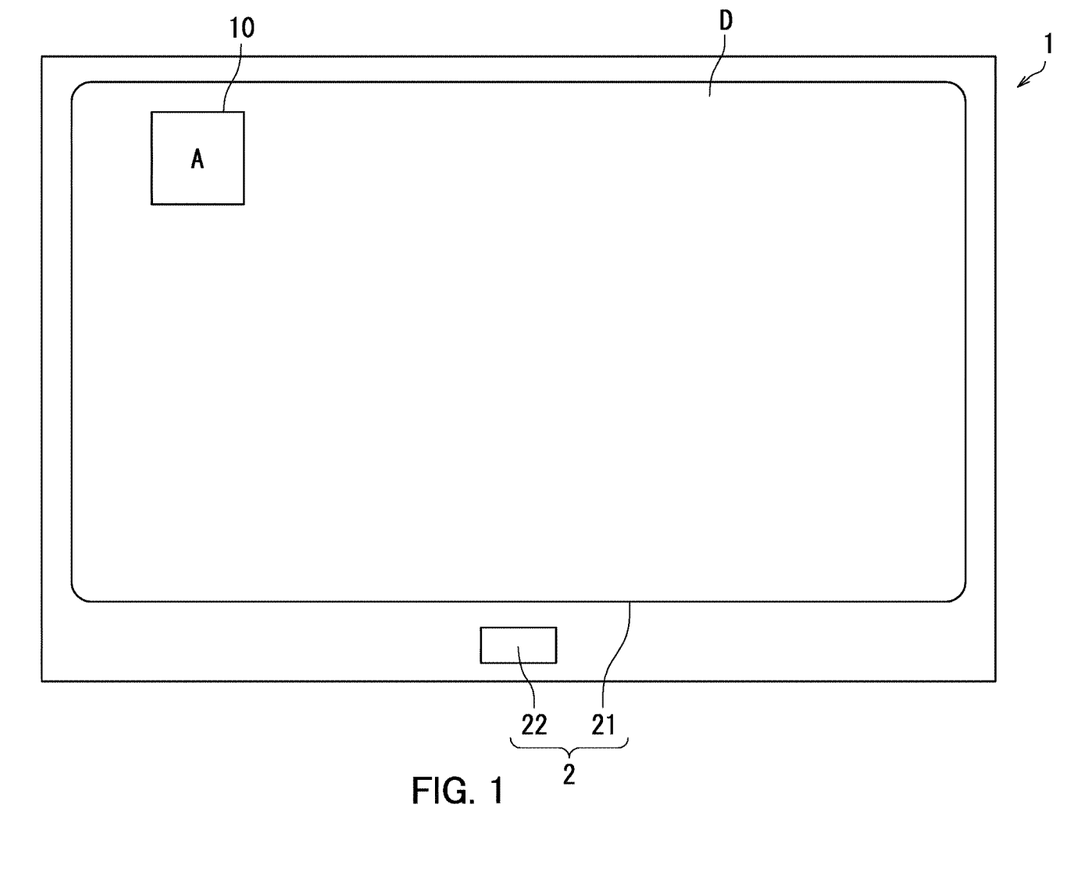
FIG. 1 is a diagram illustrating a configuration of a display processing device according to an embodiment of the present disclosure.

First, a configuration of a display processing device 1 will be described with reference to FIG. 1. FIG. 1 is a diagram illustrating the configuration of the display processing device 1. The display processing device 1 is for example a display processing device that is included in an image forming apparatus such as a multifunction peripheral.

As illustrated in FIG. 1, the display processing device 1 includes an operation section 2. The operation section 2 receives an instruction from a user to the display processing device 1. The operation section 2 also receives input of information for identifying the user. The information for identifying the user is used when user authentication is performed. The operation section 2 includes a touch panel 21 and an operation button 22.

The touch panel 21 is an example of what may be referred to as an input device or a display section. The touch panel 21 has a display surface D and a touch surface. The touch surface is disposed over the display surface D. The touch surface is not shown in FIG. 1 in order to facilitate understanding. Objects 10 are displayed on the display surface D. The objects 10 for example include an icon object, a folder object, or a file object. Hereinafter, the "icon object" will be referred to as an "icon", the "folder object" will be referred to as a "folder", and the "file object" will be referred to as a "file". A user can select one object 10 displayed on the display surface D by touching the touch surface.

The operation button 22 is for example a home key. Upon the home key being pressed, the display surface D displays thereon a welcome screen (hereinafter, referred to as a normal screen), which is displayed after the user authentication.

Figure 2:
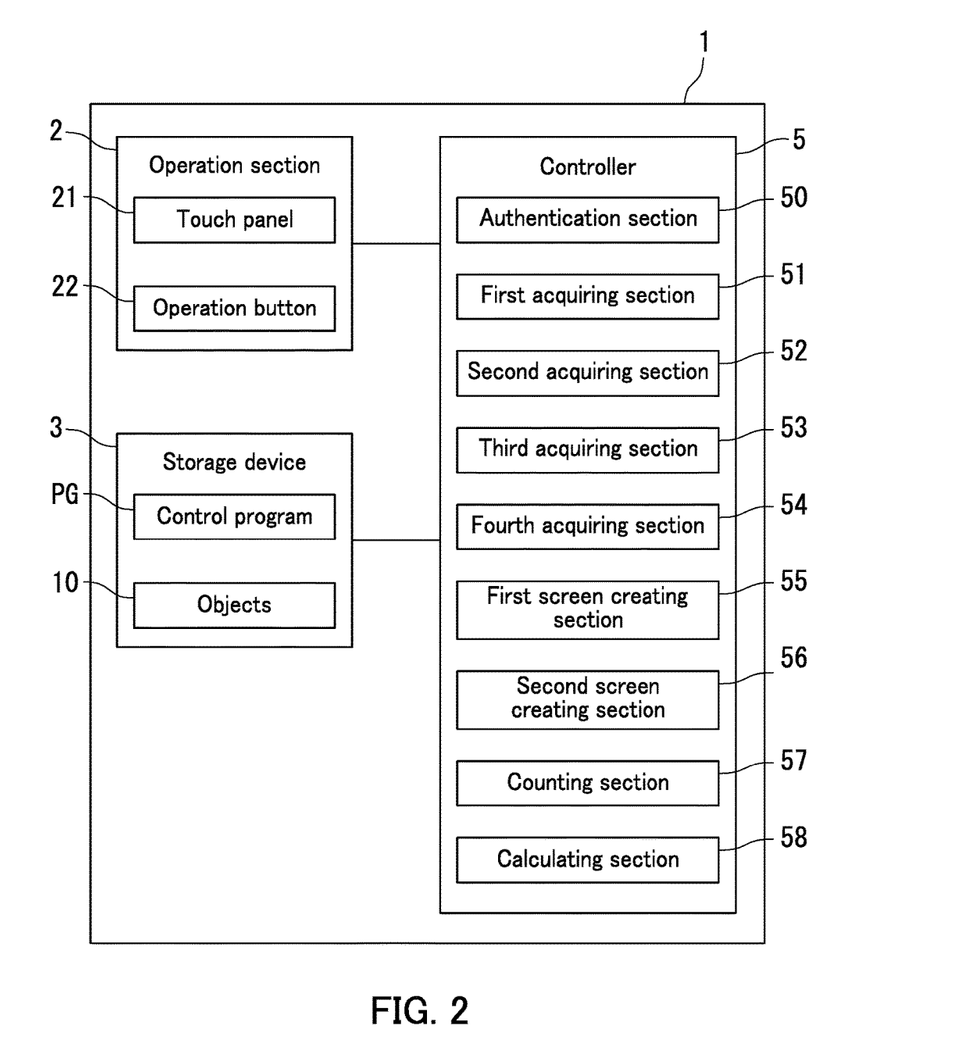
FIG. 2 is a block diagram illustrating the configuration of the display processing device according to the embodiment of the present disclosure.

The following describes the configuration of the display processing device 1 in detail with reference to FIGS. 1 and 2. FIG. 2 is a block diagram illustrating the configuration of the display processing device 1.

As illustrated in FIG. 2, the display processing device 1 further includes a storage device 3 and a controller 5.

The storage device 3 includes a hard disk drive (HDD), random access memory (RAM), read only memory (ROM), and the like. The storage device 3 stores therein a control program PG and the objects 10. Each of the objects 10 has information indicating a date and time when the object 10 was created (created date and time), information indicating a user who created the object 10 (object creating user), and information indicating an amount of data thereof. Each of the objects 10 also has information indicating one or more objects 10 located in a level one level lower than a level thereof (lower level information) in a hierarchy of the objects 10. The objects 10 include one or more first objects, which are displayed on the normal screen.

The controller 5 includes a control circuit such as a central processing unit (CPU). The controller 5 controls operation of each section of the display processing device 1 through execution of the control program PG stored in the storage device 3.

Furthermore, the controller 5 functions as an authentication section 50, a first acquiring section 51, a second acquiring section 52, a third acquiring section 53, a fourth acquiring section 54, a first screen creating section 55, a second screen creating section 56, a counting section 57, and a calculating section 58 through execution of the control program PG.

The authentication section 50 performs authentication based on information indicating a user that is input through the operation section 2. Hereinafter, a user authenticated by the authentication section 50 may be referred to as an "authenticated user".

Upon one of the first objects displayed on the display surface D being selected, the first acquiring section 51 acquires one or more second objects by reference to the lower level information of the selected first object. The second objects are objects 10 located in a level one level lower than that of the selected first object in the hierarchy.

In response to the first object displayed on the display surface D being selected, the second acquiring section 52 acquires a third object by reference to a specific condition. The third object is an object 10 located in a level lower than that of the first object in the hierarchy. More specifically, the second acquiring section 52 refers to the lower level information of the selected first object and the lower level information of objects 10 located in levels lower than that of the selected first object in accordance with the specific condition. In the present embodiment, the specific condition is set by a user through the operation section 2.

The third acquiring section 53 acquires one or more fourth objects by reference to the lower level information of the third object. The fourth objects are objects 10 located in a level one level lower than that of the third object in the hierarchy.

The fourth acquiring section 54 acquires one or more objects 10 created by the authenticated user. Hereinafter, objects 10 created by an authenticated user may be referred to as "fifth objects".

The first screen creating section 55 creates a first screen including the second objects acquired by the first acquiring section 51. The first screen is displayed on the display surface D. The second objects are displayed in a list form on the first screen.

The second screen creating section 56 creates a second screen including the fourth objects acquired by the third acquiring section 53. The second screen is displayed on the display surface D. The fourth objects are displayed in a list form on the second screen. The first and second screens are displayed simultaneously.

Upon any one of the first and second screens being selected, the touch panel 21 deletes a non-selected one of the first and second screens.

The counting section 57 counts the number of fifth objects for each of one or more sixth objects. The sixth objects are objects 10 located in levels in the hierarchy that are respectively one level higher than those of the fifth objects.

The calculating section 58 calculates a sum of data amounts of fifth objects for each of the sixth objects.

Figure 3:
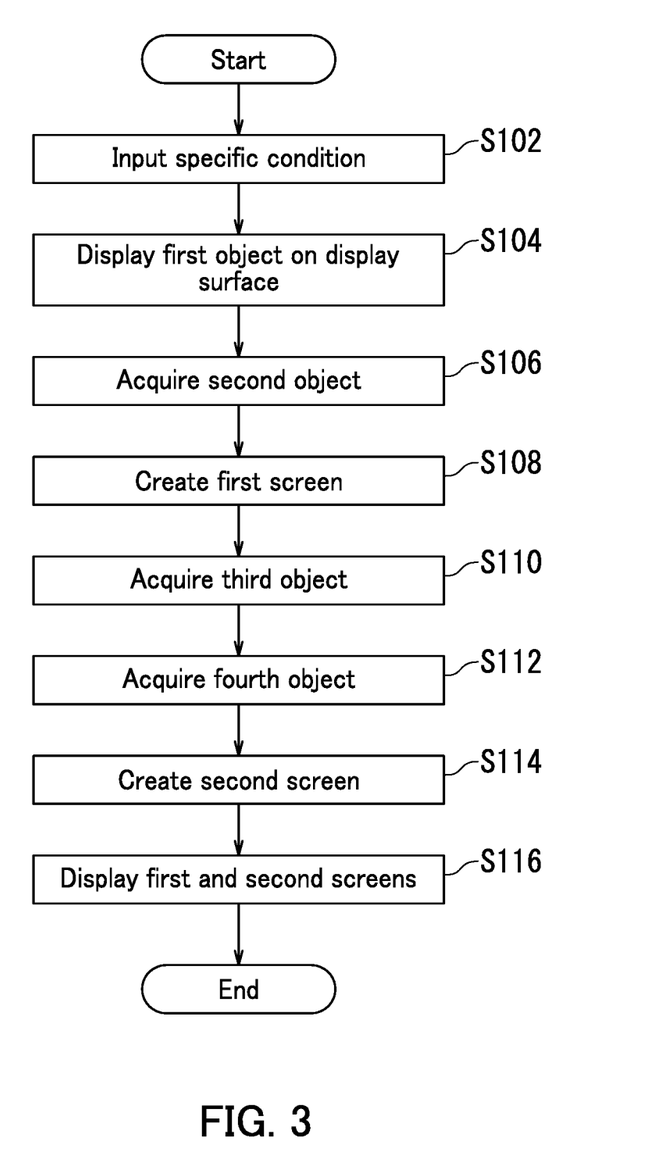
FIG. 3 is a flowchart illustrating operation of the display processing device according to the embodiment of the present disclosure.

The following describes operation of the display processing device 1 with reference to FIG. 3. FIG. 3 is a flowchart illustrating the operation of the display processing device 1.

As illustrated in FIG. 3, a user inputs a specific condition through operation of the operation section 2 (Step S102). Next, the touch panel 21 displays the first objects on the display surface D (step S104). Upon one of the first objects displayed on the display surface D being selected, the first acquiring section 51 acquires the second objects (Step S106). Next, the first screen creating section 55 creates the first screen including the second objects (step S108). Next, the second acquiring section 52 acquires the third object by reference to the specific condition (step S110). Next, the third acquiring section 53 acquires the fourth objects (step S112), and the second screen creating section 56 creates the second screen including the fourth objects (step S114). The touch panel 21 displays the first screen and the second screen on the display surface D (step S116). The order in which steps S106 to S114 are performed is not limited to the order illustrated in FIG. 3. For example, step S110 may be performed subsequently to step S106.

Figure 4:
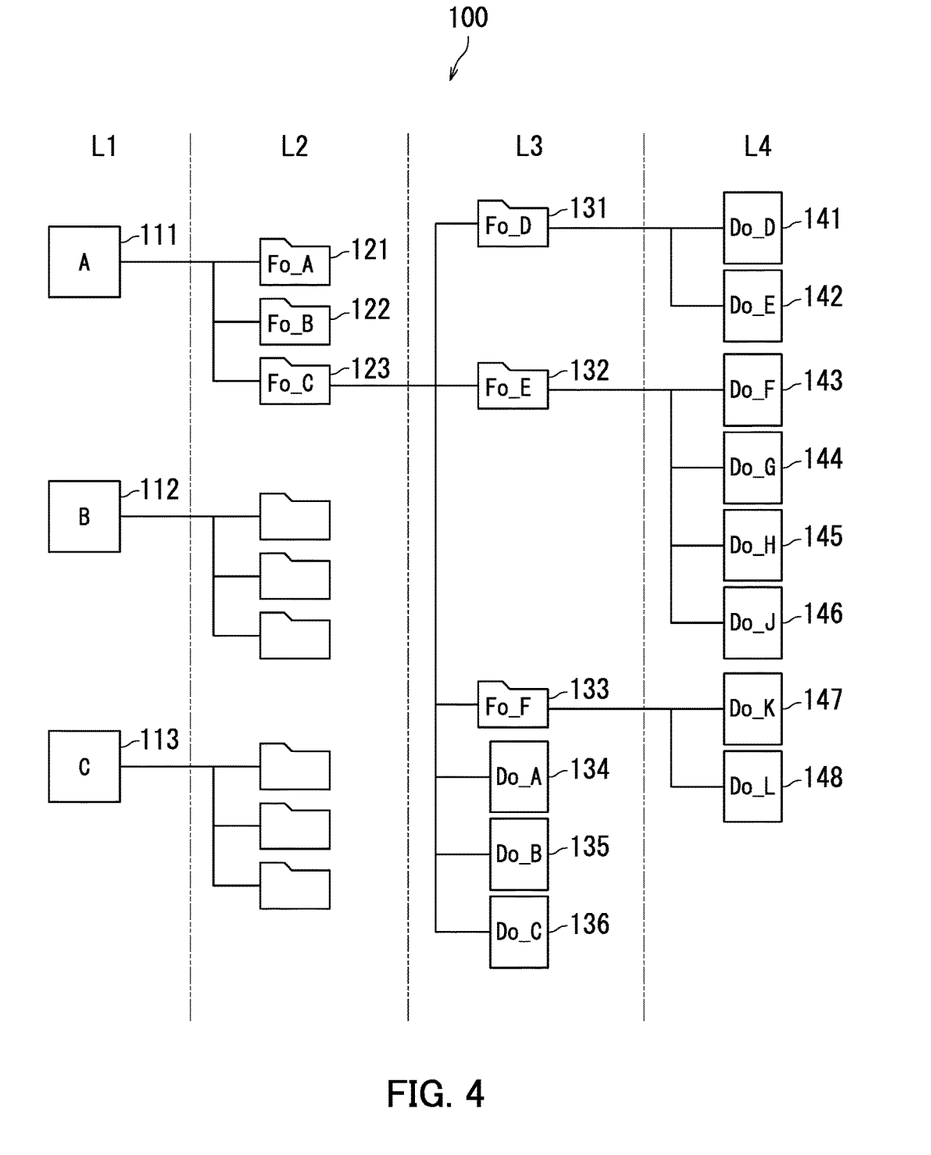
FIG. 4 is a diagram illustrating a tree structure of objects according to the embodiment of the present disclosure.

The following describes a tree structure 100 of the objects with reference to FIG. 4. FIG. 4 is a diagram illustrating the tree structure 100 of the objects.

In an example illustrated in FIG. 4, the tree structure 100 has a first level L1, a second level L2, a third level L3, and a fourth level L4. The first level L1 includes an icon "A" 111, an icon "B" 112, and an icon "C" 113. The icon "A" 111, the icon "B" 112, and the icon "C" 113 in the first level L1 are included in the normal screen.

A level (the second level L2) one level lower than that of the icon "A" 111 includes a folder "Fo_A" 121, a folder "Fo_B" 122, and a folder "Fo_C" 123.

A level (the third level L3) one level lower than that of the folder "Fo_C" 123 includes a folder "Fo_D" 131, a folder "Fo_E" 132, a folder "Fo_F" 133, a file "Do_A" 134, a file "Do_B" 135, and a file "Do_C" 136. In the present embodiment, the file "Do_A" 134 is a fifth object. That is, the file "Do_A" 134 is a file created by the authenticated user.

A level (the fourth level L4) one level lower than that of the folder "Fo_D" 131 includes a file "Do_D" 141 and a file "Do_E" 142. The file "Do_D" 141 is a fifth object. The file "Do_D" 141 is an object 10 having the latest created date and time among the fifth objects.

A level (the fourth level L4) one level lower than that of the folder "Fo_E" 132 includes a file "Do_F" 143, a file "Do_G" 144, a file "Do_H" 145, and a file "Do_J" 146. The file "Do_F" 143, the file "Do_G" 144, the file "Do_H" 145, and the file "Do_J" 146 are fifth objects. In the present embodiment, an object 10 having a largest number of fifth objects (a largest fifth object count) is the folder "Fo_E" 132.

A level (the fourth level L4) one level lower than that of the folder "Fo_F" 133 includes the file "Do_K" 147 and the file "Do_L" 148. The file "Do_K" 147 and the file "Do_L" 148 are fifth objects. In the present embodiment, an object 10 having a largest sum of data amounts of fifth objects is the folder "Fo_F" 133.

Figure 5:
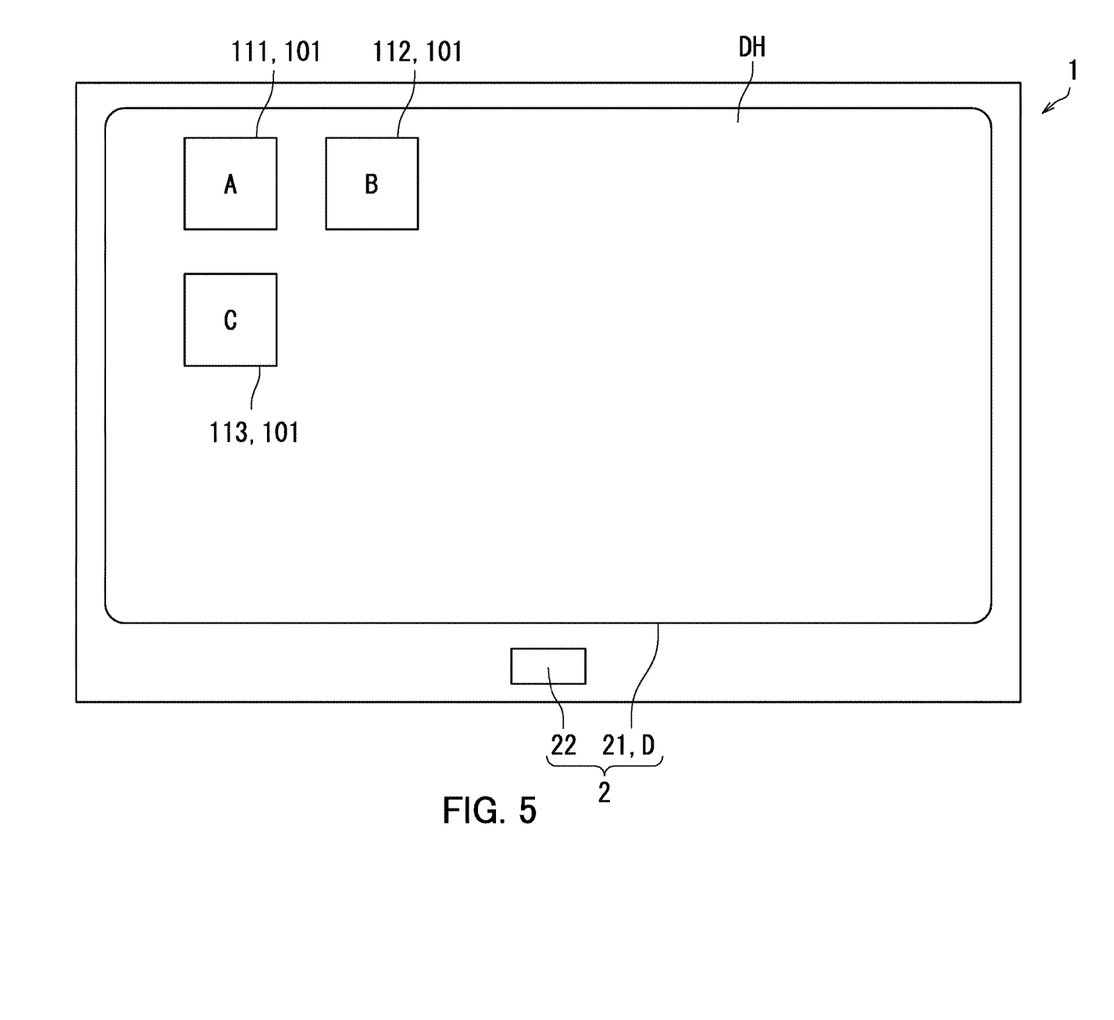
FIG. 5 is a diagram illustrating an example of a normal screen that is displayed by a touch panel according to the embodiment of the present disclosure.

The following describes screens that are displayed by the touch panel 21 with reference to FIGS. 2 to 10. FIG. 5 is a diagram illustrating an example of the normal screen.

As illustrated in FIG. 5, the touch panel 21 displays a normal screen DH. The normal screen DH includes the icon "A" 111, the icon "B" 112, and the icon "C" 113. The icon "A" 111, the icon "B" 112, and the icon "C" 113 are first objects 101.

Figure 6:
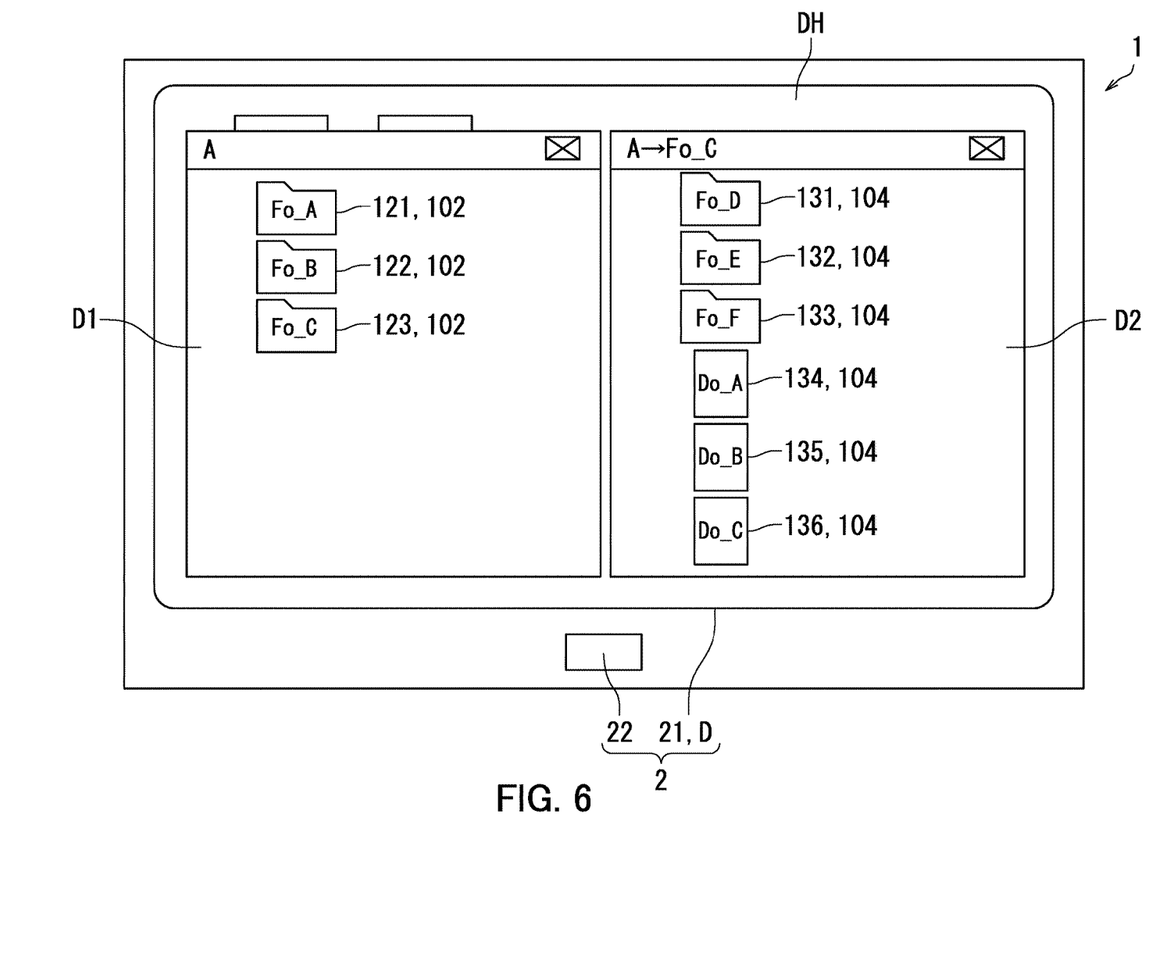
FIG. 6 is a diagram illustrating an example of screens to be displayed by the touch panel when a first condition according to the embodiment of the present disclosure is set.

FIG. 6 is a diagram illustrating an example of screens to be displayed by the touch panel 21 when a first condition is set. In the present embodiment, the first condition requires that a sixth object that is located in a level one level higher than that of a highest fifth object in the hierarchy be acquired as a third object. The second acquiring section 52 acquires such a third object by reference to the first condition.

More specifically, upon the icon "A" 111, which has been described with reference to FIG. 4, being selected, the first acquiring section 51 acquires, as second objects 102, the folder "Fo_A" 121, the folder "Fo_B" 122, and the folder "Fo_C" 123 that are located in the level one level lower than that of the icon "A" 111. The first screen creating section 55 creates a first screen D1 including the second objects 102 acquired by the first acquiring section 51. Furthermore, upon the icon "A" 111 being selected, the fourth acquiring section 54 acquires the fifth objects that are located in the levels lower than that of the icon "A" 111. The fourth acquiring section 54 extracts a highest fifth object in the hierarchy from the fifth objects. In the present embodiment, the highest fifth object in the hierarchy is the file "Do_A" 134. The second acquiring section 52 acquires, as the third object, the folder "Fo_C" 123 that is located in the level one level higher than that of the file "Do_A" 134. The third acquiring section 53 acquires, as fourth objects 104, the folder "Fo_D" 131, the folder "Fo_E" 132, the folder "Fo_F" 133, the file "Do_A" 134, the file "Do_B" 135, and the file "Do_C" 136 that are located in the level one level lower than that of the folder "Fo_C" 123. The second screen creating section 56 creates a second screen D2 including the fourth objects 104 acquired by the third acquiring section 53.

Once the first screen D1 and the second screen D2 are created, the touch panel 21 simultaneously displays the first screen D1 and the second screen D2 as illustrated in FIG. 6. In a situation in which the first condition is set as the specific condition, the second screen D2 includes the folder "Fo_D" 131, the folder "Fo_E" 132, the folder "Fo_F" 133, the file "Do_A" 134, the file "Do_B" 135, and the file "Do_C" 136.

Figure 7:
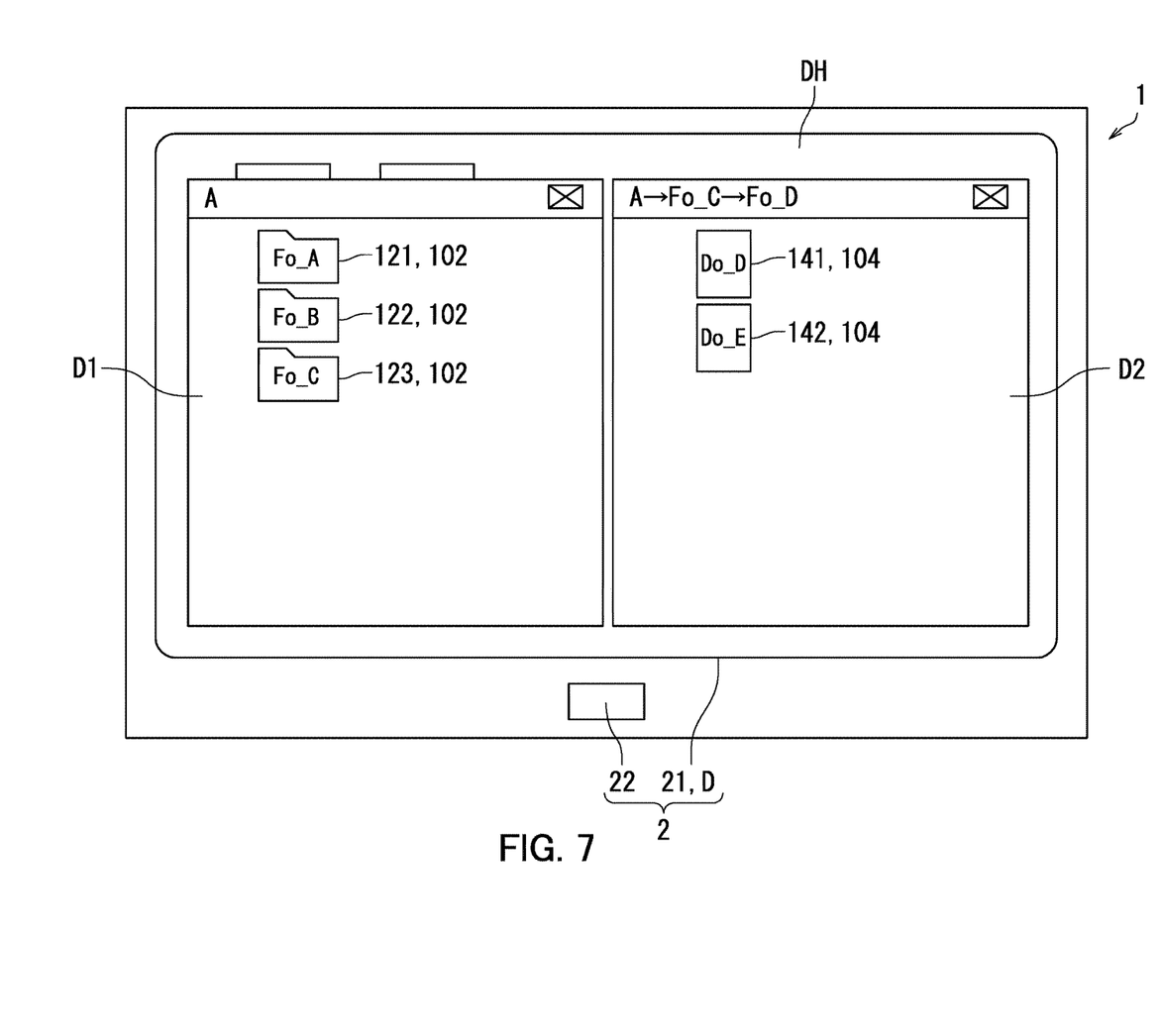
FIG. 7 is a diagram illustrating an example of screens to be displayed by the touch panel when a second condition according to the embodiment of the present disclosure is set.

The following describes, with reference to FIGS. 2 to 5 and 7, screens to be displayed by the touch panel 21 when the second condition is set. FIG. 7 is a diagram illustrating an example of the screens to be displayed by the touch panel 21 when the second condition is set. In the present embodiment, the second condition requires that a sixth object that is located in a level one level higher than a fifth object having the latest created date and time be acquired as a third object. The second acquiring section 52 acquires such a third object by reference to the second condition.

More specifically, upon the icon "A" 111, which has been described with reference to FIG. 4, being selected, the fourth acquiring section 54 acquires the fifth objects that are located in the levels lower than that of the icon "A" 111. The second acquiring section 52 refers to the information indicating the created date and time of each of the fifth objects. In the present embodiment, among the fifth objects located in the levels lower than that of the icon "A" 111, the file "Do_D" 141 has the information indicating the latest created date and time. Accordingly, the second acquiring section 52 extracts the file "Do_D" 141 from the fifth objects. The second acquiring section 52 acquires, as the third object, the folder "Fo_D" 131 that is located in the level one level higher than that of the extracted file "Do_D" 141. The third acquiring section 53 acquires, as fourth objects 104, the file "Do_D" 141 and the file "Do_E" 142 that are located in the level one level lower than that of the folder "Fo_D" 131. The second screen creating section 56 creates the second screen D2 including the fourth objects 104 acquired by the third acquiring section 53.

Once the first screen D1 and the second screen D2 are created, the touch panel 21 simultaneously displays the first screen D1 and the second screen D2 as illustrated in FIG. 7. In a situation in which the second condition is set as the specific condition, the second screen D2 includes the file "Do_D" 141 and the file "Do_E" 142.

Figure 8:
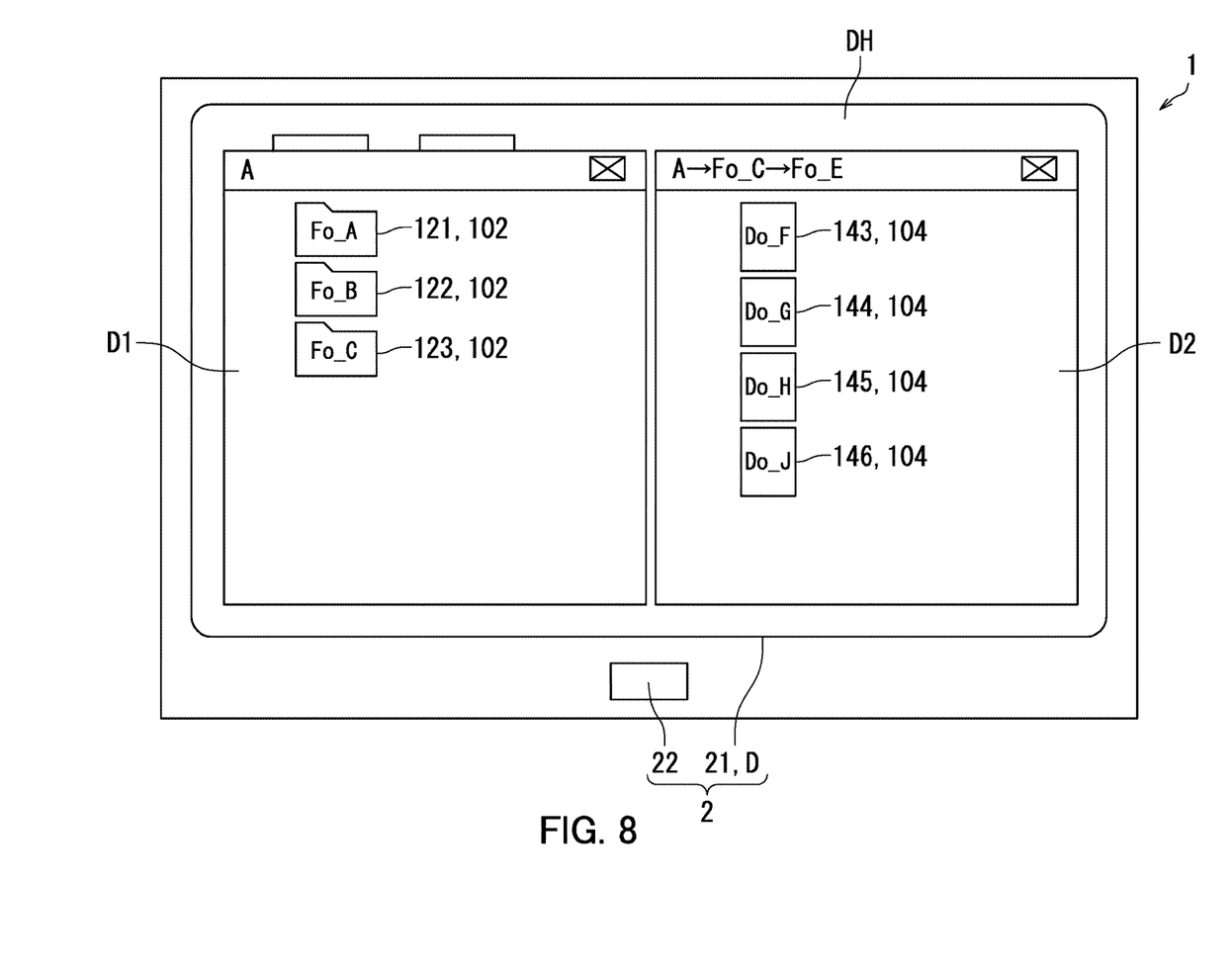
FIG. 8 is a diagram illustrating an example of screens to be displayed by the touch panel when a third condition according to the embodiment of the present disclosure is set.

The following describes, with reference to FIGS. 2 to 5 and 8, screens to be displayed by the touch panel 21 when a third condition is set. FIG. 8 is a diagram illustrating an example of the screens to be displayed by the touch panel 21 when the third condition is set. In the present embodiment, the third condition requires that a sixth object having a largest fifth object count among the fifth object counts determined by the counting section 57 be acquired as a third object. The second acquiring section 52 acquires such a third object by reference to the third condition.

More specifically, upon the icon "A" 111, which has been described with reference to FIG. 4, being selected, the fourth acquiring section 54 acquires the fifth objects that are located in the levels lower than that of the icon "A" 111. The counting section 57 counts the number of fifth objects for each sixth object. In the present embodiment, the sixth object having a largest number of fifth objects (largest fifth object count) is the folder "Fo_E" 132. Accordingly, the second acquiring section 52 acquires the folder "Fo_E" 132 as the third object. The third acquiring section 53 acquires, as fourth objects 104, the file "Do_F" 143, the file "Do_G" 144, the file "Do_H" 145, and the file "Do_J" 146 that are located in the level one level lower than that of the folder "Fo_E" 132. The second screen creating section 56 creates the second screen D2 including the fourth objects 104 acquired by the third acquiring section 53.

Once the first screen D1 and the second screen D2 are created, the touch panel 21 simultaneously displays the first screen D1 and the second screen D2 as illustrated in FIG. 8. In a situation in which the third condition is set as the specific condition, the second screen D2 includes the file "Do_F" 143, the file "Do_G" 144, the file "Do_H" 145, and the file "Do_J" 146.

Figure 9:
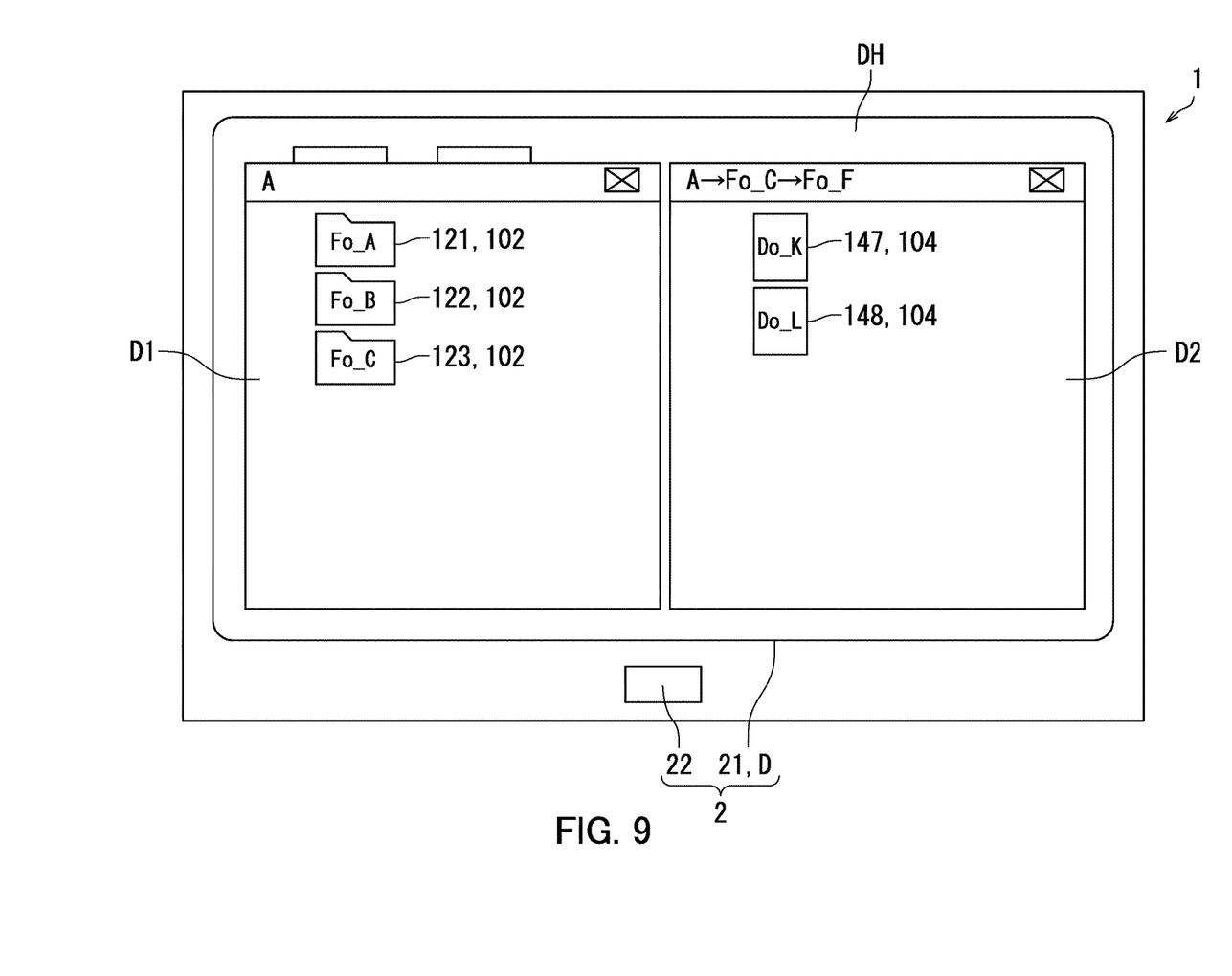
FIG. 9 is a diagram illustrating an example of screens to be displayed by the touch panel when a fourth condition according to the embodiment of the present disclosure is set.

The following describes, with reference to FIGS. 2 to 5 and 9, screens to be displayed by the touch panel 21 when a fourth condition is set. FIG. 9 is a diagram illustrating the screens to be displayed by the touch panel 21 when the fourth condition is set. The fourth condition requires that a sixth object having a largest sum among the sums calculated by the calculating section 58 be acquired as a third object.

More specifically, upon the icon "A" 111, which has been described with reference to FIG. 4, being selected, the fourth acquiring section 54 acquires the fifth objects that are located in the levels lower than that of the icon "A" 111. The calculating section 58 calculates the sum of data amounts of fifth objects for each sixth object. In the present embodiment, the sixth object having a largest sum of data amounts of fifth objects is the folder "Fo_F" 133. Accordingly, the second acquiring section 52 acquires the "Fo_F" 133 as the third object. The third acquiring section 53 acquires, as fourth objects 104, the file "Do_K" 147 and the file "Do_L" 148 that are located in the level one level lower than that of the folder "Fo_F" 133. The second screen creating section 56 creates the second screen D2 including the fourth objects 104 acquired by the third acquiring section 53.

Once the first screen D1 and the second screen D2 are created, the touch panel 21 simultaneously displays the first screen D1 and the second screen D2 as illustrated in FIG. 9. In a situation in which the fourth condition is set as the specific condition, the second screen D2 includes the file "Do_K" 147 and the file "Do_L" 148.

Figure 10:
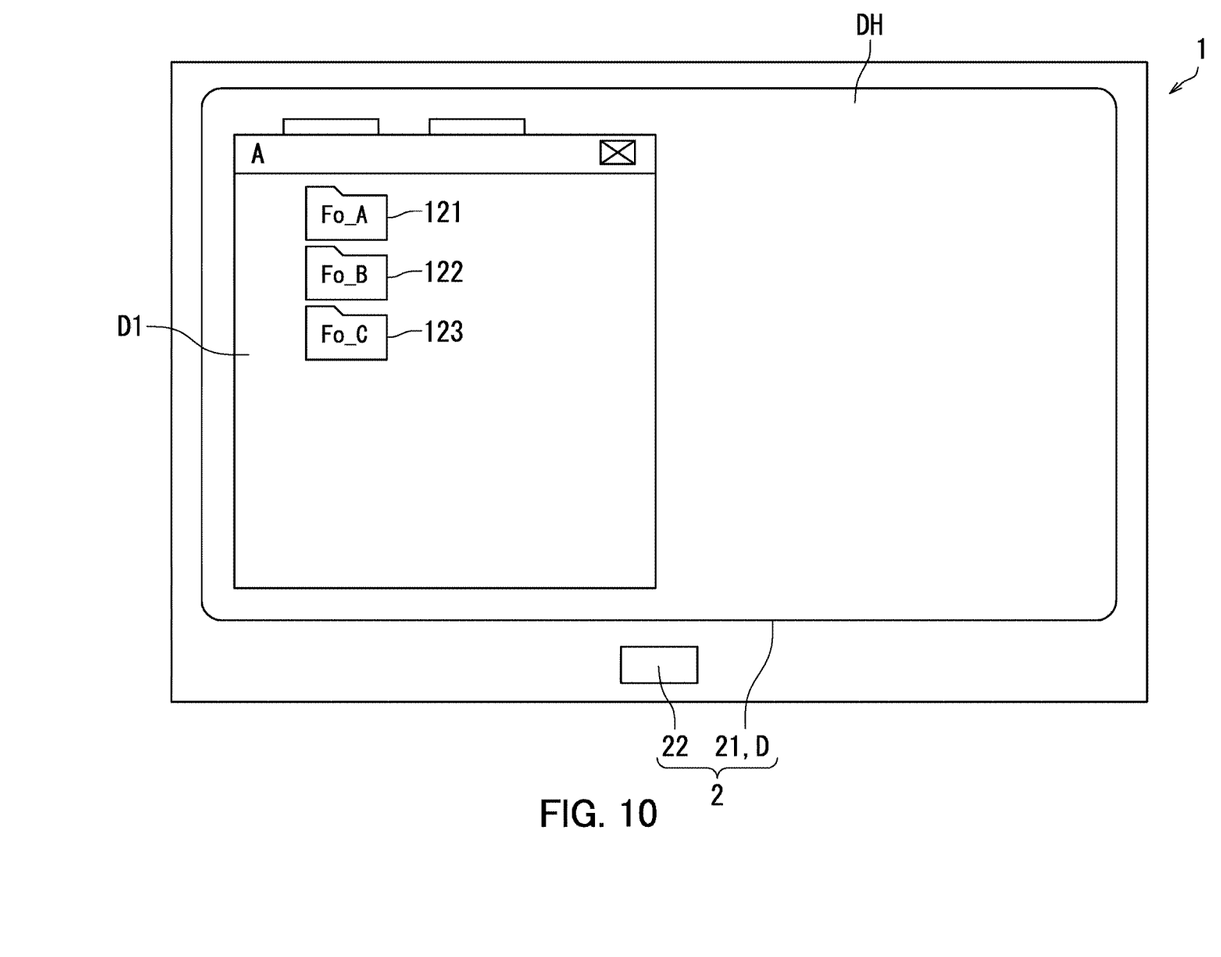
FIG. 10 is a diagram illustrating an example of a screen to be displayed by the touch panel after a first screen according to the embodiment of the present disclosure is selected.

FIG. 10 is a diagram illustrating a screen to be displayed by the touch panel 21 after the first screen D1 is selected. Upon a user touching a portion of the first screen D1 displayed on the display surface D, the second screen D2 is deleted from the display surface D as illustrated in FIG. 10.

Figure 11:
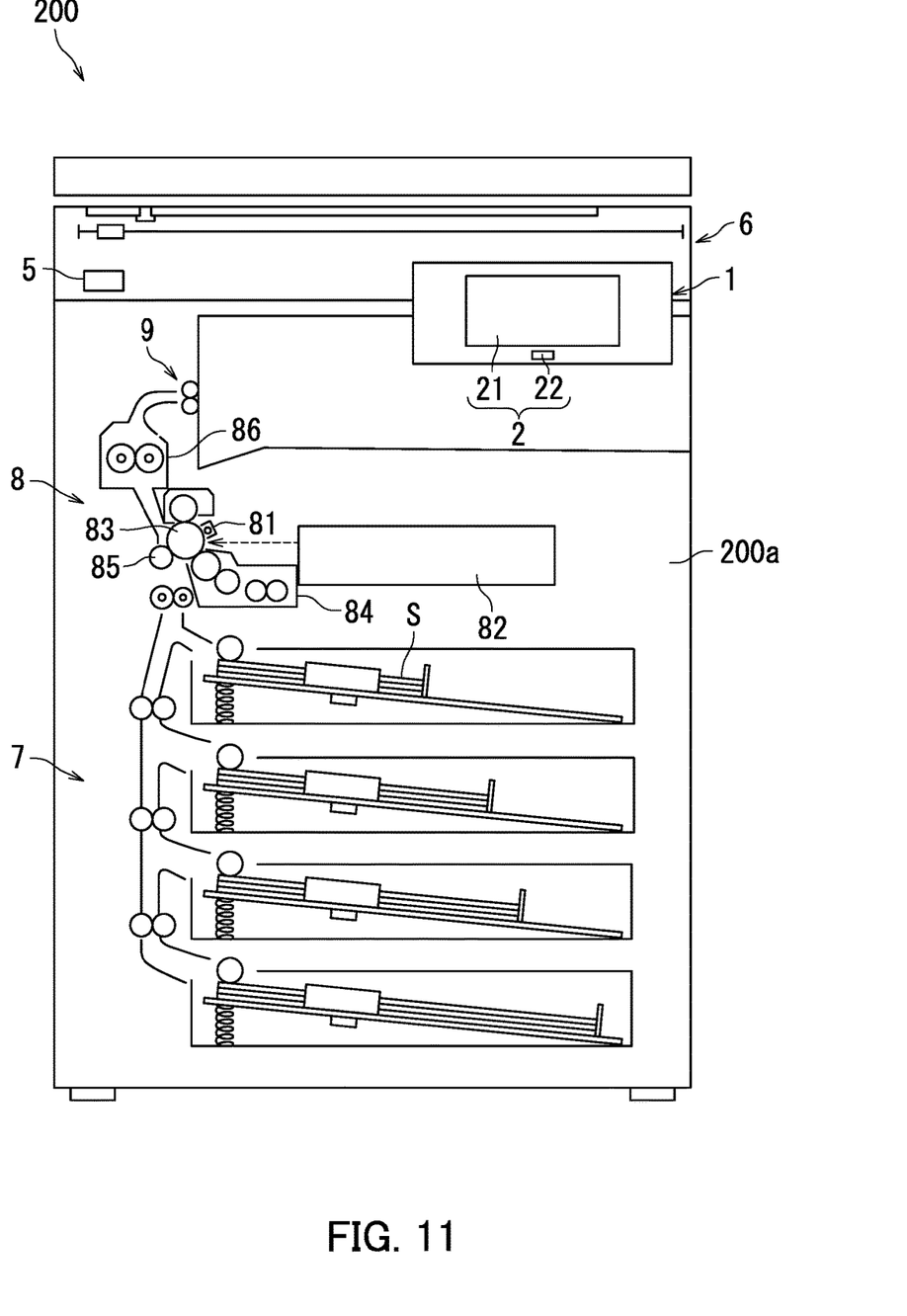
FIG. 11 is a diagram illustrating a configuration of an image forming apparatus including the display processing device according to the embodiment of the present disclosure.

The following describes, with reference to FIG. 11, a configuration of an image forming apparatus 200 including the display processing device 1 according to the present embodiment. FIG. 11 is a diagram illustrating the configuration of the image forming apparatus 200 including the display processing device 1 according to the present embodiment.

As illustrated in FIG. 11, the image forming apparatus 200 includes a housing 200a, the operation section 2, the controller 5, a reading device 6, a sheet feed section 7, an image forming section 8, and an ejection section 9.

The controller 5 further controls operation of each section of the image forming apparatus 200.

The reading device 6 is for example a scanner. The reading device 6 reads an original image formed on an original document to generate original image data. The sheet feed section 7 feeds sheets S to the image forming section 8 one sheet at a time.

The image forming section 8 forms an image on a sheet S based on image data. The image forming section 8 includes a charger 81, a light exposure device 82, a photosensitive drum 83, a developing device 84, a transfer roller 85, and a fixing device 86. The charger 81 charges the photosensitive drum 83 to a specific potential. The light exposure device 82 irradiates the photosensitive drum 83 with light based on image data. Thus, an electrostatic latent image is formed on a surface of the photosensitive drum 83. The developing device 84 supplies toner to the photosensitive drum 83. As a result, the electrostatic latent image formed on the photosensitive drum 83 is developed into a toner image. The transfer roller 85 transfers the toner image from the photosensitive drum 83 to the sheet S. The fixing device 86 fixes the toner image to the sheet S. The sheet S having the toner image fixed thereto is conveyed from the fixing device 86 toward the ejection section 9. The ejection section 9 ejects the sheet S having the image formed thereon out of the housing 200a.

Through the above, the present embodiment has been described. According to the present embodiment, upon a first object 101 being selected, the touch panel 21 simultaneously displays the first screen D1 and the second screen D2. The first screen D1 includes one or more second objects 102. The second screen D2 includes one or more fourth objects 104. The second objects 102 are located in a level one level lower than that of the first object 101. The fourth objects 104 are located in a level one level lower than that of a third object acquired by the second acquiring section 52. The third object is located in a level lower than that of the first object. Thus, a user can select an object 10 located in a lower level without repeating selection of an object 10. As a result, user's operation efficiency can be prevented from being reduced.

Typically, users tend to select an object 10 created by themselves. According to the present embodiment, each object 10 has information indicating an object creating user. The second screen D2 includes one or more objects 10 (fifth objects) created by an authenticated user. Thus, user convenience is improved.

Furthermore, according to the present embodiment, a user can set any one of the first, second, third, and fourth conditions as the specific condition. Thus, the user can customize the second screen D2. As a result, user convenience is improved.

According to the present embodiment, the display processing device 1 displays objects 10 stored in the storage device 3 included in the display processing device 1. However, the present disclosure is not limited to such an embodiment. For example, the display processing device 1 may display objects stored in an external storage device.

According to the present embodiment, upon a portion of the first screen D1 or the second screen D2 being touched, the display processing device 1 deletes a non-touched one of the first screen D1 and the second screen D2 from the display surface D. However, the present disclosure is not limited to such an embodiment. For example, the touch panel 21 may delete the second screen D2 from the display surface D when a user does not touch the touch surface within a specific time period (for example, one minute) after the first screen D1 and the second screen D2 are displayed. In such a configuration, a screen including lower objects 10 in the hierarchy is deleted in preference to the other screen. As a result, the user does not need to close a screen. Thus, user convenience is improved.

The present embodiment is described using an example in which the icon "A" 111, the icon "B" 112, and the icon "C" 113 in the first level L1 are first objects 101. However, the present disclosure is not limited to such an embodiment. For example, the objects 10 in the second level L2 may be first objects 101.

Furthermore, the present embodiment is described using an example in which the fourth acquiring section 54 acquires folders or files. However, the present disclosure is not limited to such an embodiment. For example, the fourth acquiring section 54 may acquire only files.

Through the above, an embodiment of the present disclosure has been described with reference to the drawings (FIGS. 1 to 11). However, the present disclosure is not limited to the embodiment described above and may be implemented in various different forms within the scope not departing from the gist of the present disclosure.

For example, although the embodiment of the present disclosure is described using an example in which the present disclosure is applied to the display processing device 1 included in an image forming apparatus, the present disclosure is not limited to such an embodiment. For example, the present disclosure may be applied to a display processing device included in an electronic device such as a mobile terminal.

Furthermore, the image forming apparatus may for example be an inkjet apparatus, although the embodiment of the present disclosure is described using an example in which the image forming apparatus 200 is an electrophotographic apparatus.

What is claimed is:

1. A display processing device comprising:
   a display section having a display surface;
   a storage device that stores therein, an icon, a plurality of objected, and a control program;
   a controller including a control circuit and configured to control operation of the display section through execution of the control program; and an input device configured to receive an operation by a user, wherein the icon and the plurality of objects are arranged in a hierarchy, the plurality of objects being located in levels lower than a level of the icon, the controller authenticates the user, each of the plurality of objects is a file or a folder, the plurality of objects include one or more user-created objects created by an authenticated user through operation of the input device, the authenticated user being the user successfully authenticated by the controller, the controller causes the icon to be displayed on the display surface, upon the user operating the input device to select the icon, the controller acquires one or more first objects and a first folder from the plurality of objects, the one or more first objects being located in a level one level lower than the level of the selected icon, the first folder being an object that is located in a level one level higher than a level of one of the user-created objects and that is associated with the one user-created object, the controller acquires one or more second object from the plurality of objects, the one or more second objects being located in a level one level lower than the level of the first folder, the controller creates a first screen including the acquired one or more first objects the controller creates a second screen including the acquired one or more second objects, and the controller causes the first screen and the second screen to be simultaneously displayed on the display surface such that the first screen and the second screen do not overlap.

2. The display processing device according to claim 1, wherein the controller acquires the one user-created object from the one or more user-created objects, the acquired one user-created object is the highest user-created object in the hierarchy among the one or more user-created objects, and the controller acquires, as the first folder, an object that is located in a level one level higher than the level of the acquired one user-created object and that is associated with the acquired one user-created object.

3. The display processing device according to claim 1, wherein the controller acquires the one user-created object from the one or more user-created objects, the acquired one user-created object is a user-created object having a latest created date and time among the one or more user-created objects, and the controller acquires, as the first folder, an object that is located in a level one level higher than the level of the acquired one user-created object and that is associated with the acquired one user-created object.

4. The display processing device according to claim 1, wherein the controller acquires one or more second folders from the plurality of objects, the one or more second folders are objects located in levels that are respectively one level higher than levels of the one or more user-created objects, each of the one or more second folders is associated with any of the one or more user-created objects, the controller counts, for each of the acquired one or more second folders, the number of user-created objects associated with the second folder to determine a user-created object count, and the controller acquires, as the first folder, a second folder from the one or more second folders that has a largest user-created object count among the user-created object counts.

5. The display processing device according to claim 1, wherein the controller acquires one or more second folders from the plurality of objects, the one or more second folders are objects located in levels that are respectively one level higher than levels of the one or more user-created objects, each of the one or more second folders is associated with any of the one or more user-created objects, the controller calculates, for each of the acquired one or more second folders, a sum of data amounts of user-created objects associated with the second folder, and the controller acquires, as the first folder, a second folder from the one or more second folders that has a largest sum among the sums.

6. The display processing device according to claim 1, wherein upon any one of the first screen and the second screen displayed on the display surface being selected, the controller causes a non-selected one of the first and second screens to be deleted from the display surface.

7. The display processing device according to claim 1, wherein the one or more first objects are displayed in a list form on the first screen, and the one or more second objects are displayed in a list form on the second screen.

8. An image forming apparatus comprising the display processing device according to claim 1.

* * * * *